United States Patent
Sasaki et al.

(10) Patent No.: US 10,595,110 B2
(45) Date of Patent: Mar. 17, 2020

(54) MICROPHONE DEVICE

(71) Applicant: Panasonic Intellectual Property Management Co., Ltd., Osaka (JP)

(72) Inventors: Hisayuki Sasaki, Fukuoka (JP); Haruyuki Yoshida, Fukuoka (JP); Kenta Kondou, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/205,978

(22) Filed: Nov. 30, 2018

(65) Prior Publication Data

US 2019/0230425 A1    Jul. 25, 2019

(30) Foreign Application Priority Data

Jan. 25, 2018    (JP) .................. 2018-010848

(51) Int. Cl.
| | |
|---|---|
| H04R 1/08 | (2006.01) |
| H04R 3/00 | (2006.01) |
| H04W 52/24 | (2009.01) |
| H04M 19/00 | (2006.01) |

(52) U.S. Cl.
CPC ............ *H04R 1/08* (2013.01); *H04M 19/008* (2013.01); *H04R 3/005* (2013.01); *H04W 52/242* (2013.01); *H04W 52/245* (2013.01); *H04R 2420/07* (2013.01)

(58) Field of Classification Search
CPC ........ H04W 52/245; H04S 2/242; H04R 1/08; H04R 3/005; H04R 2420/07; H04M 19/08
See application file for complete search history.

(56) References Cited

U.S. PATENT DOCUMENTS

| | | | | |
|---|---|---|---|---|
| 2001/0034214 | A1* | 10/2001 | Koike ............... | H04B 1/04 |
| | | | | 455/95 |
| 2002/0118823 | A1 | 8/2002 | Tomobe | |
| 2009/0315397 | A1* | 12/2009 | Udo .................. | G06F 1/26 |
| | | | | 307/31 |
| 2015/0063604 | A1 | 3/2015 | Ohbuchi et al. | |
| 2016/0212555 | A1 | 7/2016 | Honda et al. | |

FOREIGN PATENT DOCUMENTS

| | | |
|---|---|---|
| JP | 02-303318 | 12/1990 |
| JP | 2002-252731 | 9/2002 |
| JP | 2003-032880 | 1/2003 |
| JP | 2008-072569 | 3/2008 |
| JP | 2015-50727 | 3/2015 |
| JP | 2016-096368 | 5/2016 |
| JP | 2016-134666 | 7/2016 |

* cited by examiner

*Primary Examiner* — Regina N Holder

(74) *Attorney, Agent, or Firm* — Wenderoth, Lind & Ponack, L.L.P.

(57) ABSTRACT

There is provided a microphone device for transmitting a collected audio signal to a receiving device wirelessly. The microphone device includes a battery, a current suppresser that is connected in series with the battery and suppresses a current from the battery and a plurality of transformers each of which is connected in series between the current suppresser and each of a plurality of loads and outputs a voltage in response to a corresponding load of the plurality of loads connected thereto based on an output of the current suppresser.

2 Claims, 12 Drawing Sheets

MICROPHONE DEVICE

BACKGROUND OF THE INVENTION

Field of the Invention

The present disclosure is related to a microphone device which transmits a collected audio signal to a receiving device in a wireless manner.

Background Art

In the related art, in a case of driving a wireless microphone as an example of a microphone device which performs time division communication for transmitting a collected audio signal to a receiving device in a wireless manner, two or more AA type batteries, lithium ion batteries with high voltage, and the like are usually used so as to supply a sufficient current to a load which varies in time division constituting various electric circuits embedded in the microphone device. On the other hand, since a suppliable current is limited if only one AA type battery is used, for example, at the time of turning on a power supply or transmitting wireless communication, a sufficient voltage for a large current flowing cannot be supplied and the load cannot be driven, in some cases.

JP-A-2015-50727 discloses a wireless communication system which includes one master device and a plurality of microphone slave devices and the master device performs wireless communication with each of the microphone slave devices by using a time division multiplex communication method. In this wireless communication system, in order to suppress radio wave interference to other wireless communication systems, the master device suppresses transmission power to the distant microphone slave device to the extent that communication can be maintained.

SUMMARY OF THE INVENTION

However, in the related art including JP-A-2015-50727, in a case where the wireless microphone described above uses two AA type batteries, for example, since a housing (a housing on a side where the battery is built in) of the wireless microphone becomes heavy or becomes large, balance feeling of weight feeling of the housing of the wireless microphone is not good and it is difficult to handle the wireless microphone such as talking with a hand for a long time or the like. In addition, as the number of batteries increases, it is difficult to miniaturize the wireless microphone, which may impair a design quality of the microphone.

An object of the present disclosure is to provide a microphone device which supplies a voltage to various loads included in an embedded electric circuit even when using one battery, and improves handling at the time of use and improves convenience of the user.

According to the present disclosure, there is provided a microphone device for transmitting a collected audio signal to a receiving device wirelessly, the microphone device including: a battery; a current suppresser that is connected in series with the battery and suppresses a current from the battery; and a plurality of transformers each of which is connected in series between the current suppresser and each of a plurality of loads and outputs a voltage in response to a corresponding load of the plurality of loads connected thereto based on an output of the current suppresser.

According to the present disclosure, it is possible to supply a voltage to various loads included in an embedded electric circuit even when using one battery, and to improve handling at the time of use and improve convenience of the user.

DETAILED DESCRIPTION OF THE EXEMPLARY EMBODIMENT

Hereinafter, each of embodiments which specifically disclose a microphone device according to the present disclosure will be described in detail with reference to the appropriate drawings. However, in some cases, an unnecessarily detailed explanation may be omitted. For example, in some cases, a detailed explanation of already well-known items and a repetition explanation of substantially the same configuration may be omitted. This is for avoiding unnecessary repetition of the following description and for facilitating understanding by those skilled in the art. The accompanying drawings and the following description are provided to enable those skilled in the art to fully understand the present disclosure and are not intended to limit a scope of the claims.

A microphone device according to each of the embodiments is a wireless microphone which transmits a collected audio signal to a master device in a wireless manner. In a wireless microphone system including a master device and a plurality of wireless microphones, each of the plurality of wireless microphones communicates with the master device by, for example, time division multiple access (TDMA). In the following description, the wireless microphone is simply referred to as "microphone slave device".

Embodiment 1

Figure 1:
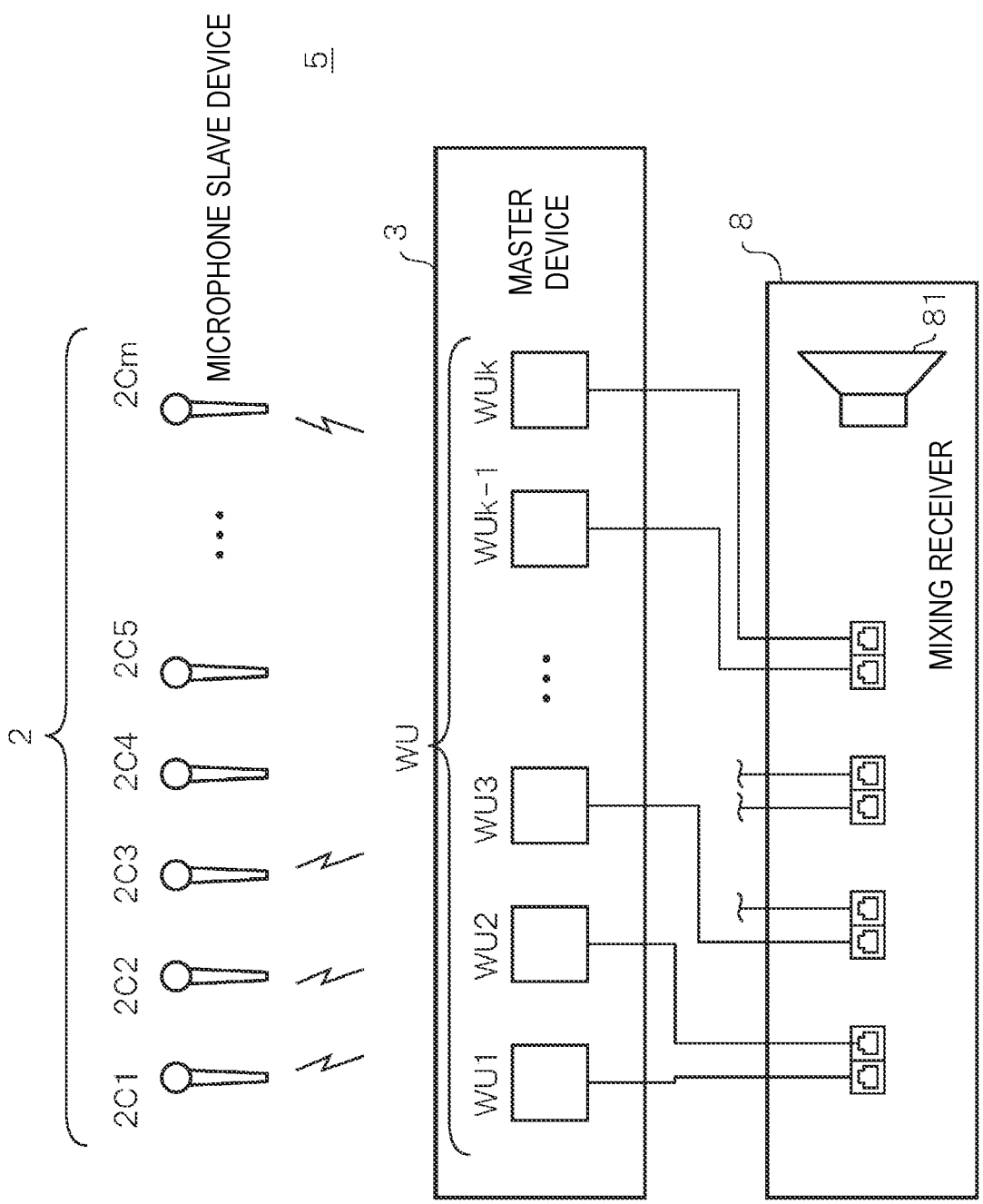
FIG. 1 is a diagram schematically illustrating a system configuration example of a wireless microphone system according to Embodiment 1.

FIG. 1 is a diagram schematically illustrating a system configuration example of a wireless microphone system 5 according to Embodiment 1. The wireless microphone system 5 is configured to include a plurality (for example, m) of microphone slave devices 2, a master device 3 as an example of a receiving device, and a mixing and receiving device 8. Here, m is an integer equal to or larger than 2. In the following description, in a case where a plurality of microphone slave devices 2C1, 2C2, . . . , and 2Cm are not particularly distinguished from one another, each of the plurality of microphone slave devices 2C1, 2C2, . . . , and 2Cm is referred to as the microphone slave device 2.

A wireless signal (for example, an audio signal or a control signal) is transmitted and received between the microphone slave device 2 and the master device 3 through a wireless line according to a communication standard (for example, a time division multiplex communication method) of a time division multiple access method. If a user of the microphone slave device 2 inputs a sound to the microphone slave device 2 (for example, make a sound), a collected audio signal is transmitted to the master device 3 by the microphone slave device 2 through a wireless line. In each of the embodiments, as a communication standard of the time division multiplex communication method, a digital enhanced cordless telecommunications (DECT) method with a frequency bandwidth of 1.9 GHz, which is a standard of a digital cordless telephone established in 2011, will be exemplified and explained.

The master device 3 illustrated in FIG. 1 is a comprehensive master device which collectively refers to master devices WU1, WU2, . . . , and WUk of master devices (for example, k) respectively capable of receiving an audio signal from each of the microphone slave devices 2, the master device 3 may be understood as one master device. That is, in the following description, each of the master devices WU to Wk may be replaced with one master device 3. Here, k is an integer equal to or larger than 1. In the description in FIG. 1, in a case where a plurality of master devices WU1 to WUk are not particularly distinguished from one another, each of the plurality of master devices WU1 to WUk is referred to as a master device WU, in some case. Based on the audio signal received by the master device WU, the sound is output to a speaker (not illustrated) embedded in the master device WU to reproduce the sound or is further output to the mixing and receiving device 8. The mixing and receiving device 8 combines one or more audio signals input from the master device 3 and causes an embedded speaker 81 to output a sound which is the combined audio signal.

Figure 2:
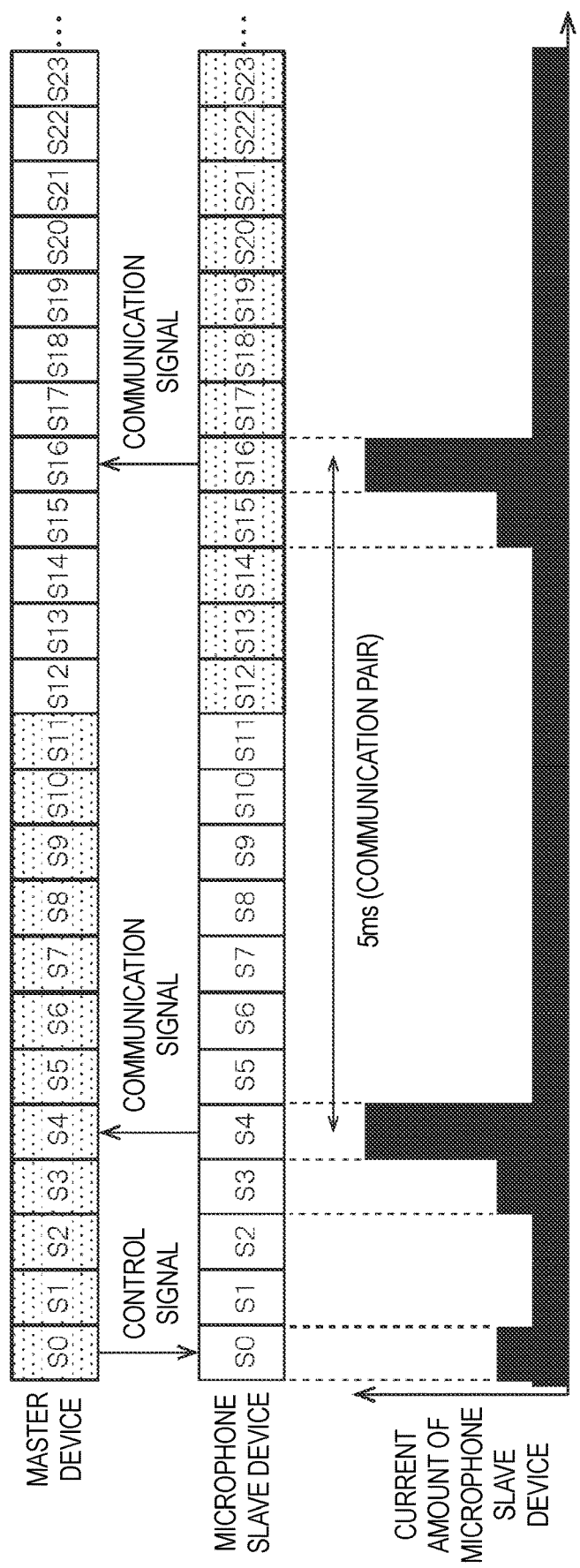
FIG. 2 is an explanatory diagram illustrating a time slot when a wireless signal is transmitted and received between a master device and a microphone slave device and an example of a change of the amount of current flowing through the microphone slave device for each of the time slots.
Figure 3:
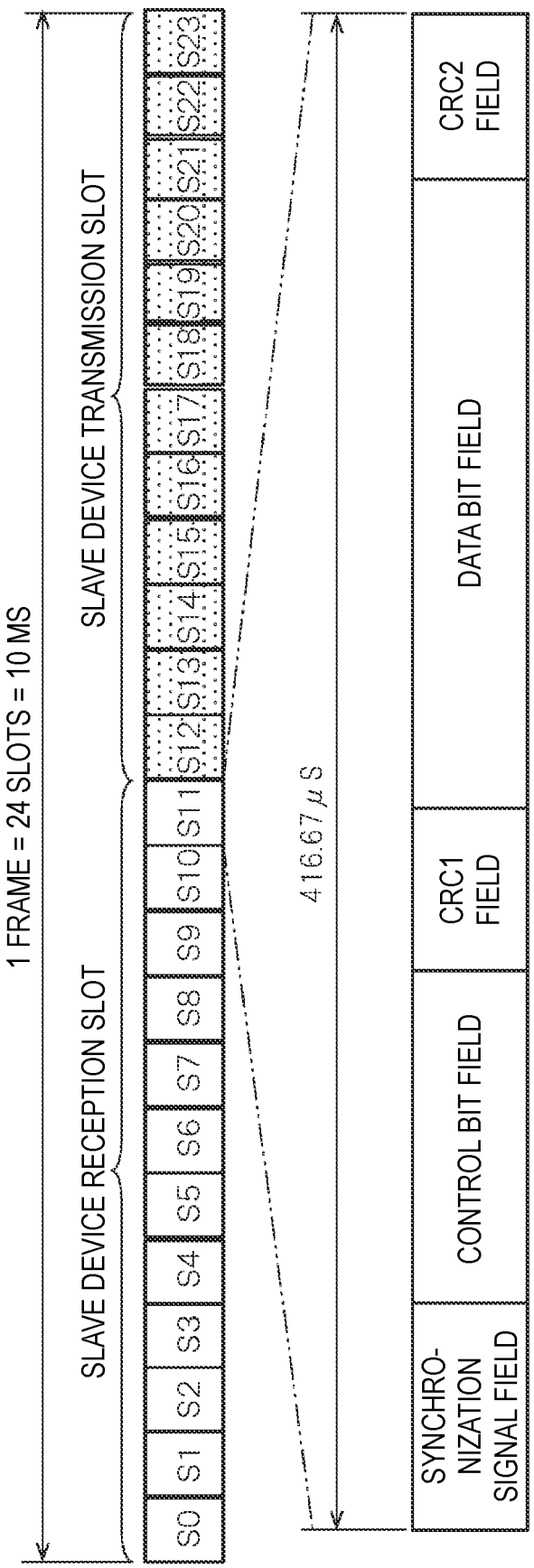
FIG. 3 is a diagram illustrating a frame configuration example of a wireless signal in DECT communication.

FIG. 2 is an explanatory diagram illustrating a time slot when a wireless signal is transmitted and received between the master device 3 and the microphone slave device 2 and an example of a change of the amount of current flowing through the microphone slave device 2 for each of the time slots. Hereinafter, the time slot is simply referred to as "slot". FIG. 3 is a diagram illustrating a frame configuration example of a wireless signal in DECT communication. The wireless signal is transmitted and received between the master device 3 and each of the microphone slave devices 2 every frame period by using a default number (for example, n) of slots defined according to a communication standard. In a case where the communication standard is a DECT method, one frame period corresponds to 10 ms and is configured to include, for example, n=24 slots (that is, 12 slots for downlink and 12 slots for uplink).

In wireless communication (hereinafter, referred to as "DECT communication") using the DECT method, generally, slots S0 to S11 for downlink are used for communication from the master device 3 to each of the microphone slave devices 2. Slots S12 to S23 for uplink are used for communication from each of the microphone slave devices 2 to the master device 3. In the communication between the master device 3 and the microphone slave device 2, the slots having a positional relationship in which the slots are separated by 5 ms corresponding to ½cycles are used in combination (a pair of slots) such as the slots S0 and S12, the slots S1 and S13, and the like. The pair of slots constitutes one channel (for example, control channel for transmitting and receiving control information and communication channel for transmitting and receiving an audio signal).

In addition, among the 12 slots through which the transmission is performed from the master device 3 to the microphone slave device 2, at least one slot (for example, slot S0) is used as a control slot for transmitting the control signal including the control information from the master device 3 to each of the microphone slave devices 2. The control signal is transmitted from the master device 3 to each of the microphone slave devices 2 by using one slot among the slots of a default number constituting one frame period. In a case where radio frequency interference occurs while the control signal is transmitted from the master device 3 to the microphone slave device 2, the empty slot (in other words, unused slot) may be used as the control slot. For example, in a case where radio frequency interference or the like occurs in the slot S0, the master device 3 may change the control slot from the slot S0 to another empty slot (for example, slot for switching). In conjunction with this, a response slot to the control slot (that is, the slot used for a response to the control slot and used for transmission from the microphone slave device 2 to the master device 3) is changed from the slot S12 to another empty slot (for example, another slot for switching). In this way, the master device 3 dynamically determines the slot used as the control channel or the communication channel every frame period of the DECT communication according to a radio environment (in other words, a reception status of a radio wave) or the like between the master device 3 and each of the microphone slave devices 2. For example, in a device such as a cordless phone or the like, the master device is a transmission side and the slave device is a reception side in the first half slots S0 to S11 and the master device is the reception side and the slave device is the transmission side in the latter half slots S12 to S23.

On the other hand, in the wireless microphone system 5, the master device 3 receives the audio signal transmitted from each of the plurality of microphone slave devices 2. In addition, the master device 3 may transmit the control signal to each of the microphone slave devices 2 once during one frame period. Therefore, in the present embodiment, the master device 3 dynamically determines the slots S0 to S11 so as to use the first half slots S0 to S11 as the slot for uplink (communication slot) in which the microphone slave device 2 is the transmission side.

For example, the master device 3 determines the slot S0 within one frame period as the control channel for transmitting the control signal and transmits the control signal to each of the microphone slave devices 2 through the control channel. The control information included in the control signal includes, for example, system information, slot information, and carrier information. Specifically, the control information includes, for example, identification information of the microphone slave device 2 which is a communication target using a carrier and a slot, identification information of the carrier or the slot, information such as slot switching or the like by a busy state of each of the slots, designation of an available empty slot, the number of connected microphone slave devices, a radio error status of the master device, radio interference.

Each of the slots constituting one frame of the DECT communication is defined by a time width of 416.67 μs (=10 ms/24), specifically, is configured to include a synchronization signal field, a control bit field, a CRC1 field, a data bit field, and a CRC2 field. The synchronization signal field includes fixed data configured to include a data string for synchronizing bits and a data string for synchronizing of slots. The control bit field includes the control signal described above. In a case where the amount of control information included in the control signal increases, for example, not only the control bit field but also a part of an area of the data bit field may be used. The CRC1 field includes a cyclic redundancy check (CRC) code calculated based on the data string of the control bit field and is used for detecting a transmission error of the control bit field. The data bit field is used for audio communication. The CRC2 field includes a CRC code calculated based on the data string of the data bit field and is used for detecting a transmission error of the data bit field.

In FIG. 2, the master device 3 transmits the control signal to the microphone slave device 2 in the slot S0. When the microphone slave device 2 receives the control signal transmitted from the master device 3, the microphone slave device 2 requires power for driving a reception circuit such as a radio unit 11 or the like (see FIG. 4) embedded in the microphone slave device 2 and the amount of current in the microphone slave device 2 increases.

Since the microphone slave device 2 does not perform transmitting and receiving operation in the slots S1 and S2, only small current for driving a controller 10 mainly flows in the microphone slave device 2.

In the slot S3, in order to prepare for the transmission of a wireless signal (for example, audio signal) in the slot S4, power for driving a transmission circuit such as the radio unit 11 or the like is required and the amount of current in the microphone slave device 2 increases.

In the slot S4, since the microphone slave device 2 transmits the audio signal to the master device 3, the microphone slave device 2 requires large power for driving the radio unit 11, a power amplifier 11A, and the like and the amount of current in the microphone slave device 2 is the largest in the slots in one frame period.

Since the microphone slave device 2 does not perform transmitting and receiving operation in the slots S5 and S14, the same amount of current as the slots S1 and S2 flows in the microphone slave device 2.

In the slots S15 and S16, since the radio unit 11 or the power amplifier 11A requires large power like the slots S3 and S4, the amount of current in the microphone slave device 2 increases and is the largest in the slot S16 in the slots in one frame period, in the same manner as the slot S4. After then, the same operation is executed.

Hardware Configuration of Microphone Slave Device

Figure 4:
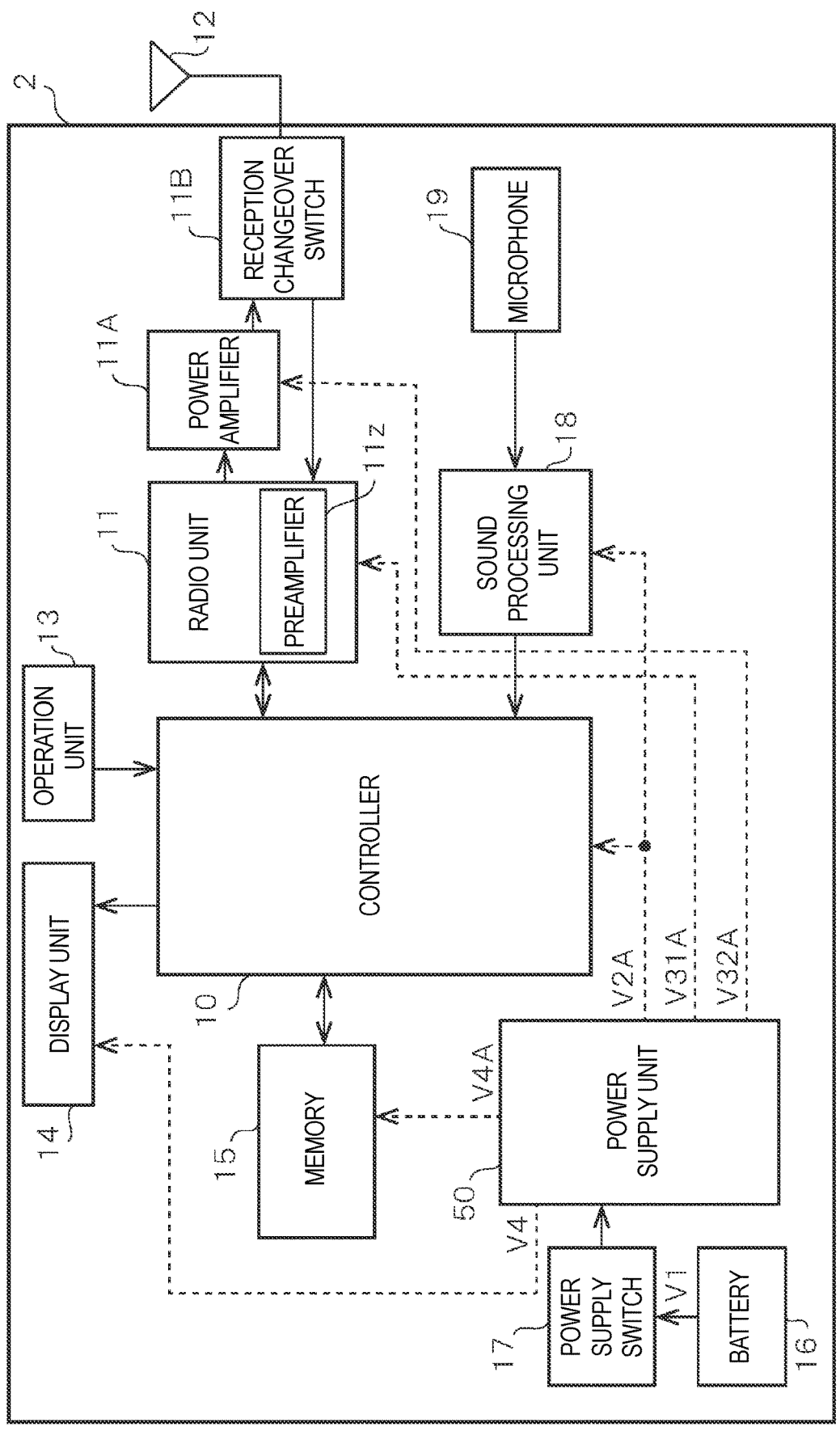
FIG. 4 is a block diagram illustrating a hardware configuration example of the microphone slave device.

FIG. 4 is a block diagram illustrating a hardware configuration example of the microphone slave device 2. The microphone slave device 2 includes the controller 10, the radio unit 11, the power amplifier 11A, a transmission and reception changeover switch 11B, and an antenna 12 connected to the transmission and reception changeover switch 11B.

The controller 10 is configured to include a processor such as a central processing unit (CPU), a micro processing unit (MPU), a digital signal processor (DSP), a field programmable gate array (FPGA), or the like and controls an operation of each of units of the microphone slave device 2. The controller 10 outputs a switching signal for switching transmission or reception of a wireless signal in the transmission and reception changeover switch 11B to the transmission and reception changeover switch 11B.

The radio unit 11 as an example of a wireless communication unit includes a preamplifier 11z for amplifying a transmission signal at an input stage.

The power amplifier 11A as an example of the wireless communication unit amplifies the transmission signal amplified by the preamplifier 11z up to a predetermined level.

The transmission and reception changeover switch 11B as an example of the wireless communication unit switches the wireless signal transmitted and received via the antenna 12 to be transmitted and received according to a switching signal from the controller 10, for example.

In addition, the microphone slave device 2 is configured to include an operation unit 13, a display unit 14, and a memory 15.

The operation unit 13 includes various buttons as a user interface.

The display unit 14 displays setting contents and the like by the operation unit 13.

The memory 15 temporarily stores audio data generated by a sound processing unit 18, in addition to storing various control programs and data for operating the microphone slave device 2 and data of various setting values.

In addition, the microphone slave device 2 includes a battery 16, a power supply switch 17, a power supply unit 50, the sound processing unit 18, and a microphone 19.

The battery 16 is configured with a minimum number of batteries (for example, one battery) capable of operating the microphone slave device 2 according to Embodiment 1. The battery 16 is a single battery having an output voltage of 1.0 V to 1.5 V, for example. Note that the minimum number of batteries is not limited to one battery. For example, in a case where the microphone slave device 2 requires a battery which outputs a voltage of 2.0 V to 3.0 V, in the related art, four batteries are used so that even if an inrush current occurs, the microphone slave device can be activated. In this case, if two batteries are connected in series, it is possible to output a voltage of 2.0 V to 3.0 V, so that the minimum number of batteries is two. In addition, the battery 16 is, for example, an AA type battery. A size of the battery is not limited to the AA type battery but may be a D type battery, a C type battery, an AAA type battery, or the like. Further, a type of the battery may be a primary battery such as an alkaline dry battery or a manganese dry battery, or a secondary battery such as a rechargeable nickel hydrogen battery, a nickel-cadmium battery, or the like.

The power supply switch 17 is a switch for switching the power supply of the microphone slave device 2 to be turned on or off, and is operated by the user.

The power supply unit 50 applies a battery voltage to each of units of the microphone slave device 2 which is a load of the battery 16. Each of the units of the microphone slave device 2 which is a load of the battery 16 is the controller 10, the radio unit 11 including the preamplifier 11z, the power amplifier 11A, the sound processing unit 18, the memory 15, and the display unit 14. Details of an internal configuration of the power supply unit 50 will be described below.

The microphone 19 collects, for example, a sound which the user makes.

The sound processing unit 18 performs a predetermined audio process on an audio signal collected by the microphone 19 to generate audio data (audio signal) of the sound which the user makes. In the audio process, audio compression, noise removal, and the like are performed.

Power Supply Unit of Comparative Example

Figure 5:
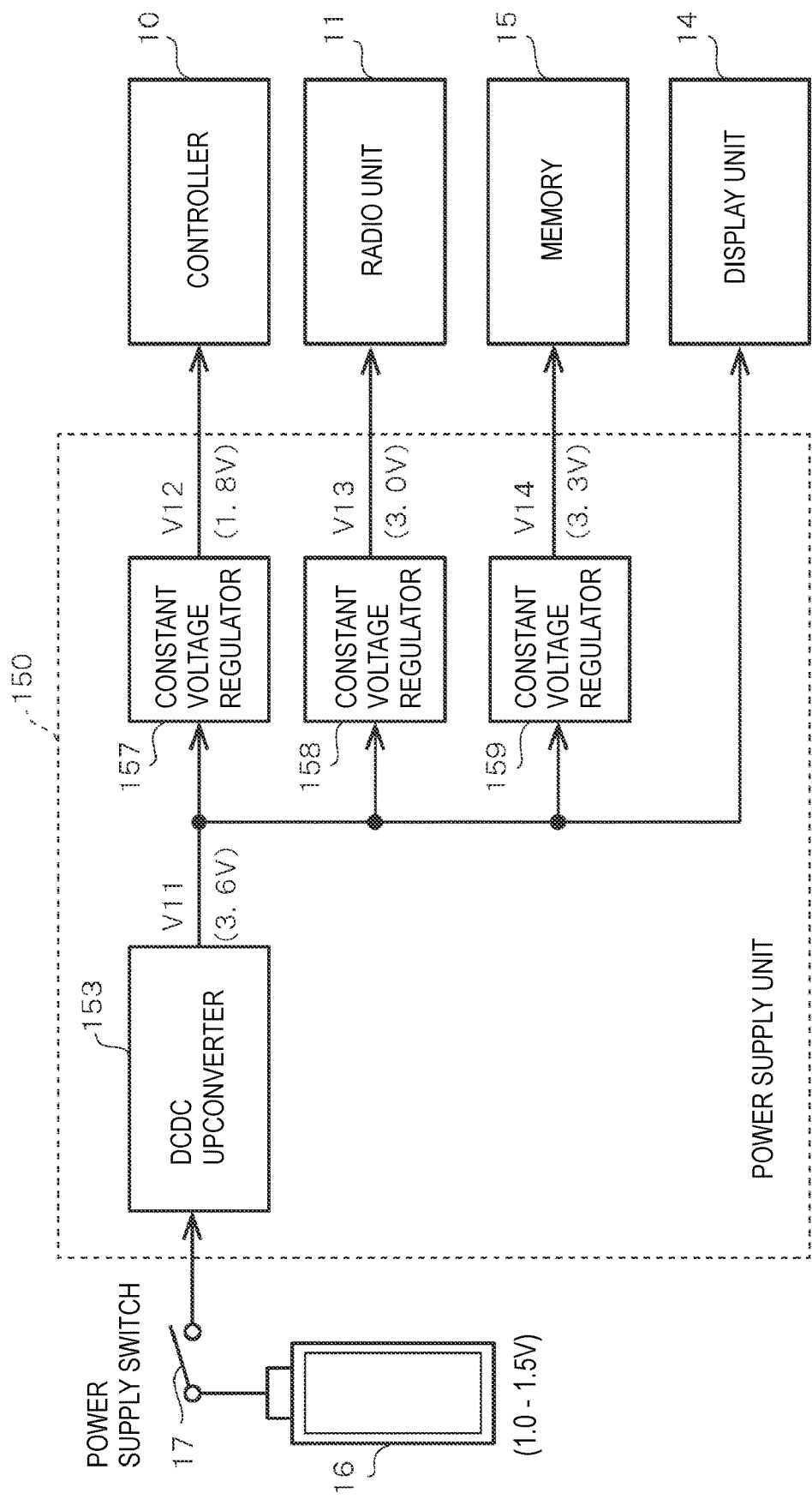
FIG. 5 is a diagram illustrating an overall configuration example of a power supply unit according to a comparative example.

First, the power supply unit of the microphone slave device which is a comparative example of the microphone slave device according to Embodiment 1 will be described with reference to FIG. 5. FIG. 5 is a diagram illustrating an overall configuration example of a power supply unit 150 according to the comparative example. In the microphone slave device illustrated in FIG. 5, since a configuration of each of units other than the power supply unit according to the comparative example may be the same as that of the microphone slave device according to Embodiment 1, the same reference numerals are given.

The power supply unit 150 includes a DCDC up-converter 153 and three constant voltage regulators 157, 158, and 159.

The DCDC up-converter 153 increases a voltage (for example, 1.2 V) of the battery 16 up to a predetermined voltage V11 (for example, 3.6 V) and supplies the voltage V11 to each of the three constant voltage regulators 157, 158, and 159.

The constant voltage regulator 157 is a low dropout (LDO) which inputs the voltage V11 of the battery 16 and outputs a voltage V12 (for example, 1.8 V) lower than the voltage V11, and applies the voltage V12 to the controller 10 which is a load.

The constant voltage regulator 158 is a low dropout (LDO), inputs the voltage V11 of the battery 16 and outputs a voltage V13 (for example, 3.0 V), and applies the voltage V13 to the radio unit 11 which is a load.

The constant voltage regulator 159 is a low dropout (LDO), inputs the voltage V11 of the battery 16 and outputs a voltage V14 (for example, 3.3 V), and applies the voltage V14 to the memory 15 which is a load.

In addition, the DCDC up-converter 153 applies the voltage V11 to the display unit 14 which is a load without via the constant voltage regulator.

In the power supply unit 150, at the time of the power-on by the power supply switch 17, the inrush current flows from the battery 16 to the DCDC up-converter 153. The inrush current begins to flow by turning on the power supply, reaches a peak current value larger than a steady state current value at the beginning of the flow, then gradually decreases and reaches the stable steady state current value. For this reason, at the time of the inrush current, the voltage (battery voltage) of the battery 16 decreases and an activation condition (for example, the battery voltage is equal to larger than a predetermined value) of the microphone slave device is not satisfied, so that it is also assumed that the microphone slave device is not activated.

In addition, since the DCDC up-converter 153 has to amplify the voltage up to nearly three times an input voltage, it is assumed that use efficiency of the battery 16 is poor and a life of the battery 16 is shortened. Further, in a case where the load is the controller 10, although a voltage of 1.8 V is required, an input voltage of the constant voltage regulator 157 is 3.6 V which is considerably higher than the voltage of 1.8 V. In the constant voltage regulator 157, a difference between the input voltage of 3.6 V and the output voltage of 1.8 V is large and a power loss at the time of controlling the constant voltage, and which is not efficient.

In addition, in the time division multiplex communication such as DECT communication, a large current flows through the radio unit 11 or the power amplifier 11A at the time of transmission, and the battery voltage suddenly decreases. For this reason, it is also assumed that the voltage applied to the radio unit 11 or the controller (processor) 10 becomes equal to or lower than a specified voltage and the processor shuts down.

Figure 6:
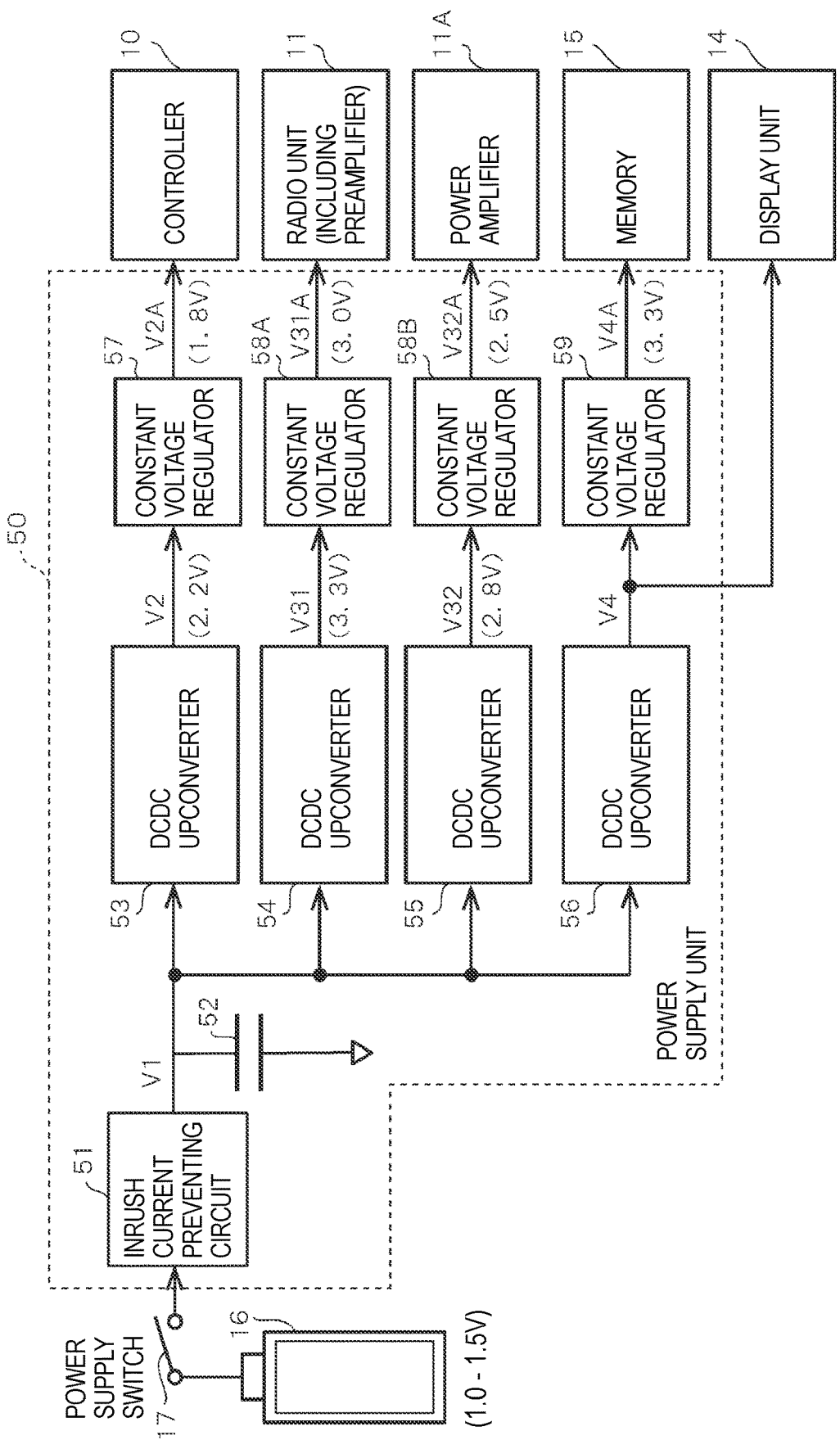
FIG. 6 is a diagram illustrating an overall configuration example of a power supply unit according to Embodiment 1.

For this reason, Embodiment 1 includes the power supply unit 50 capable of preventing the inrush current due to the power-on of the power switch, reducing the power loss, and supplying a large current at the time of transmission (See FIG. 6).

Power Supply Unit of Embodiment 1

FIG. 6 is a diagram illustrating an overall configuration example of the power supply unit 50 according to Embodiment 1. The power supply unit 50 includes an inrush current preventing circuit 51, a large capacity capacitor 52, four DCDC up-converters 53 to 56, and four constant voltage regulators 57 to 59. When the power supply switch 17 is turned on, the voltage of the battery 16 is applied to the microphone slave device 2.

The inrush current preventing circuit 51 as an example of a current suppressing unit prevents a large inrush current from flowing from the battery 16 to the microphone slave device 2 at the time of the power-on, so that the current at the time of the inrush flows through the large capacity capacitor 52. The inrush current preventing circuit 51 may limit the amount of current, and may be, for example, a constant current circuit or a resistor.

The large capacity capacitor 52 as an example of the current suppressing unit is a large-capacity low-loss capacitor having a capacitance capable of storing the inrush current as a charge. The current from the time of the power-on to the time of the inrush becomes the suppressed peak current value. When the time until the current reaches the stable steady state current value elapses, the large capacity capacitor 52 is charged up to a predetermined voltage (that is, charge is stored). The large capacity capacitor 52 can supply the current to the DCDC up-converters 53 to 56 in the latter stage with the charged stable voltage.

The DCDC up-converter 53 as an example of a transformer increases the voltage V1 (for example, 1.2 V) of the battery 16 up to a voltage V2 (for example, 2.2 V) and outputs the voltage to the constant voltage regulator 57. The constant voltage regulator 57 as an example of a transformer is a low dropout (LDO), inputs the voltage V2 increased by the DCDC up-converter 53 and controls the voltage so that a voltage V2A (for example, 1.8 V) applied to the controller 10 which is a load becomes constant. The constant voltage regulator 57 is not always necessary according to a request of the load (for example, the output of the DCDC up-converter 56 is used as it is for the display unit 14 or the like). In the following description, a case where the constant voltage regulator is required will be described as an example.

The DCDC up-converter 54 as an example of a transformer increases the voltage V1 (for example, 1.2 V) of the battery 16 up to a voltage V31 (for example, 3.3 V) and outputs the voltage to the constant voltage regulator 58A. The constant voltage regulator 58A as an example of a transformer is a low dropout (LDO), inputs the voltage V31 increased by the DCDC up-converter 54 and controls the voltage so that a voltage V31A (for example, 3.0 V) applied to the radio unit 11 (including the preamplifier 11z) which is a load becomes constant.

The DCDC up-converter 55 as an example of a transformer increases the voltage V1 (for example, 1.2 V) of the battery 16 up to a voltage V32 (for example, 2.8 V) and outputs the voltage to the constant voltage regulator 58B. The constant voltage regulator 58B as an example of a transformer is a low dropout (LDO), inputs the voltage V32 increased by the DCDC up-converter 55 and controls the voltage so that a voltage V32A (for example, 2.5 V) applied to the power amplifier 11A which is a load becomes constant.

The DCDC up-converter 56 as an example of a transformer increases the voltage V1 (for example, 1.2 V) of the battery 16 up to a voltage V4 (for example, 3.6 V) and outputs the voltage to the constant voltage regulator 59. The constant voltage regulator 59 as an example of a transformer is a low dropout (LDO), inputs the voltage V4 increased by the DCDC up-converter 56 and controls the voltage so that a voltage V4A (for example, 3.3 V) applied to the memory 15 which is a load becomes constant. In addition, the DCDC up-converter 56 applies the voltage V4 to the display unit 14 which is a load without via the constant voltage regulator.

In this way, in the power supply unit 50 of the microphone slave device 2 according to Embodiment 1, at the time of the power-on by the power supply switch 17, the current supplied from the battery 16 is suppressed by the inrush current preventing circuit 51 and the large capacity capacitor 52 is charged with the current at the time of the inrush less as compared with the inrush current. When the voltage of the large capacity capacitor 52 becomes close to the voltage of the battery 16, the current is supplied to the DCDC up-converters 53 to 56 via the large capacity capacitor 52. Since the current from the battery 16 at the time of the inrush is suppressed to be small, it is possible to suppress the battery voltage from suddenly decreasing. In addition, since the voltage of the battery 16 does not suddenly decrease, it is possible to maintain the activation condition (that the battery voltage is equal to or larger than a predetermined value, for example) of the microphone slave device and to avoid a situation in which the microphone slave device is not activated.

Further, since a plurality of DCDC up-converters 53 to 56 which output voltages corresponding to the voltages applied to the respective loads are provided, it is possible to reduce a difference between the input voltage input from each of the DCDC up-converters 53 to 56 to each of the constant voltage regulators 57 to 59 and the output voltage. Therefore, it becomes possible to suppress a loss of power occurring in each of the constant voltage regulators. As a result, it is possible to perform highly efficient current supply for each of the DCDC up-converters. In addition, the power supply (a combination of the DCDC up-converter and the constant voltage regulator) is divided by the radio unit 11 (including the preamplifier 11z) used for radio transmission and the power amplifier 11A. Therefore, the power supply unit 50 can operate the DCDC up-converter and the constant voltage regulator suitable for each of the radio unit 11 (including the preamplifier 11z) and the power amplifier 11A with high efficiency. Accordingly, consumption of the battery is reduced and a life of the battery can be extended.

In addition, in the time division multiplex communication, although a large current flows through the radio unit 11 at the time of transmission other than the time of the inrush, since the large charge is stored in the large capacity capacitor 52, the current flowing through the radio unit 11 can be provided with the charge stored in the large capacity capacitor 52. Therefore, it is possible to avoid the processor from shutting down without a sudden drop of the battery voltage.

As described above, the microphone slave device 2 according to Embodiment 1 performs the wireless communication of the collected audio signal with the master device 3. The microphone slave device 2 includes one battery 16, the inrush current preventing circuit 51 and the large capacity capacitor 52 which are connected with the battery 16 in series and suppress the inrush current from the battery 16, a set of the plurality of DCDC up-converters 53 to 56 and the constant voltage regulators 57 to 59 which are connected in series between each of the controller 10, the radio unit 11, (including the preamplifier 11z), the power amplifier 11A, the memory 15, and the display unit 14 which are a plurality of loads and the large capacity capacitor 52, and output a voltage according to the respectively connected loads based on the output of the large capacity capacitor 52.

As a result, even if the microphone slave device 2 uses only one battery 16, it is possible to prevent the inrush current from the battery 16 to a load side by the power supply switch 17 being turned on and to supply a voltage required for various loads (the controller 10, the radio unit 11, the power amplifier 11A, the memory 15, and the display unit 14) included in an embedded electric circuit. Therefore, a large current does not flow at the time of activation and the microphone slave device can be driven with a normal current value. Accordingly, the battery 16 can be used as, for example, one AA type battery and the microphone slave device 2 can improve handling at the time of use by the user and improve convenience.

In addition, the inrush current preventing circuit 51 as an example of a suppression circuit suppresses the inrush current from the battery 16. The large capacity capacitor 52 as an example of a capacitor stores the current from the battery 16 at the time of the inrush as a charge and has a capacity (predetermined capacity) capable of supplying a sufficient current to the subsequent stage of the DCDC up-converters 53, 54, 55, and 56 in the latter stage. As a result, in a case where, for example, a resistor is used as the inrush current preventing circuit 51, it is possible to easily prevent the inrush current and to reduce the number of batteries 16 required for driving the microphone slave device 2 only by adding a resistor and a large capacity capacitor.

In addition, the microphone slave device 2 includes the radio unit 11 and the power amplifier 11A which perform the wireless communication with the master device 3 by using the time division multiplex communication method. The radio unit 11 and the power amplifier 11A transmit the collected audio signal to the master device 3 by using the charge stored in the large capacity capacitor 52 by the current from the battery 16. As a result, even if the microphone slave device 2 uses one battery 16, it is possible to supply the large current at the time of transmission of the wireless communication to the radio unit 11 and the power amplifier 11A.

In addition, the DCDC up-converters 53, 54, 55, and 56 increase the voltage applied by the battery 16 according to the respectively connected loads. The constant voltage regulators 57, 58A, 58B, and 59 respectively output the voltages required for operations of the connected loads to the loads based on the respective output voltage of the DCDC up-converters 53, 54, 55, and 56. As a result, it is possible to reduce a difference between each of the input voltages and each of the output voltages of the constant voltage regulators 57 to 59 and to reduce a power loss.

Embodiment 2

In the power supply unit 50 of the microphone slave device 2 according to Embodiment 1, the inrush current preventing circuit 51 suppresses the inrush current flowing through the large capacity capacitor 52. For the power supply unit 50 of the microphone slave device 2 according to Embodiment 2, an example in which the current as the inrush current is suppressed to be a constant current will be described.

The power supply unit 50 of the microphone slave device 2 according to Embodiment 2 has the same configuration as the power supply unit 50 of the microphone slave device 2 according to Embodiment 1 except for a suppression circuit 60A, so the same as in Embodiment 1 is denoted by the same reference numeral, and description thereof will be simplified or omitted.

Figure 7:
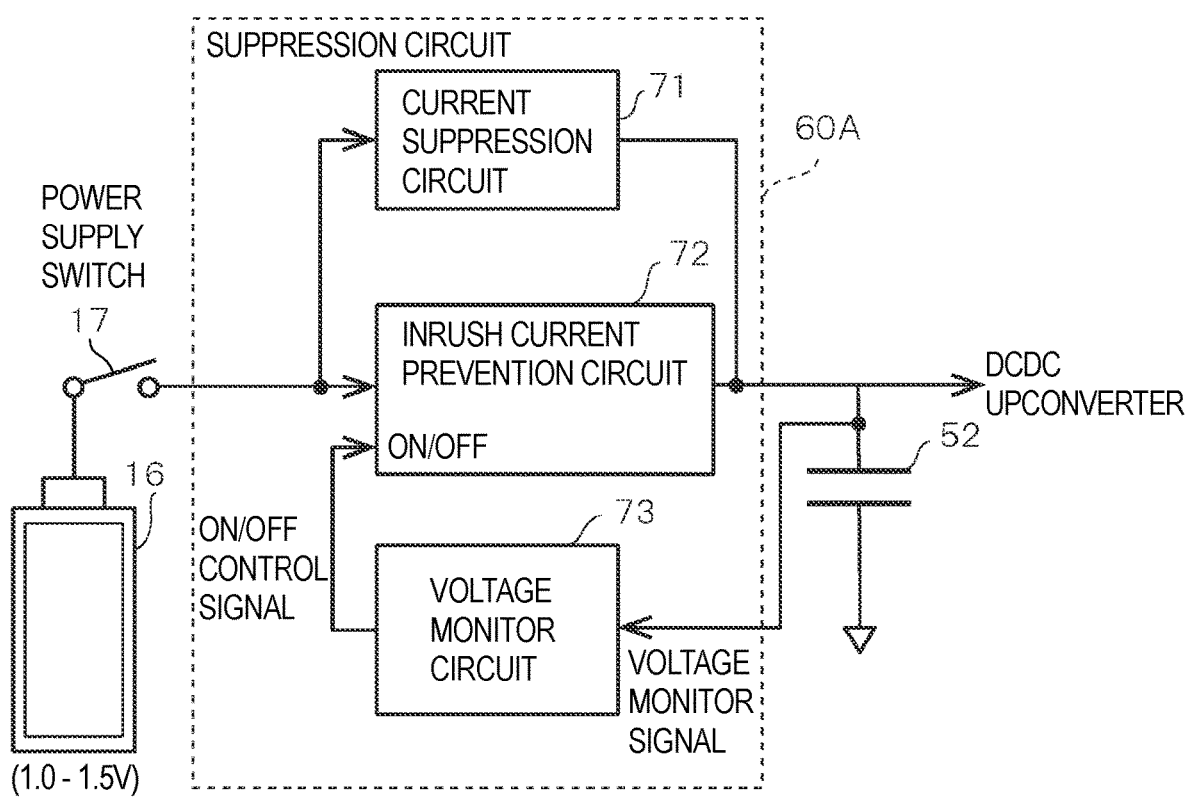
FIG. 7 is a diagram illustrating a configuration example of a suppression circuit according to Embodiment 2.

FIG. 7 is a diagram illustrating a configuration example of the suppression circuit 60A according to Embodiment 2. The suppression circuit 60A is configured to include a current suppression circuit 71, an inrush current prevention circuit 72, and a voltage monitor circuit 73.

The current suppression circuit 71 as an example of a first suppression circuit is provided between the power supply switch 17 and the large capacity capacitor 52 and controls the current flowing from the battery 16 to a DCDC up-converter side to be a constant current. The current suppression circuit 71 may be, for example, a constant current circuit or a resistor including a resistance value (an example of a first impedance) obtained by decreasing the inrush current.

The inrush current prevention circuit 72 as an example of a second suppression circuit is connected to the current suppression circuit 71 in parallel and includes an on/off terminal. The inrush current prevention circuit 72 has a resistance value smaller than a resistance value of the current suppression circuit 71 when a signal (that is, on/off control signal) from the voltage monitor circuit 73 input to the on/off terminal is ON. On the other hand, the inrush current prevention circuit 72 has a resistance value larger than the resistance value of the current suppression circuit 71 when the signal (that is, on/off control signal) from the voltage monitor circuit 73 is OFF. The inrush current prevention circuit 72 is configured by using, for example, a load switch. When the inrush current prevention circuit 72 is OFF, the inrush current prevention circuit 72 has a higher resistance than the current suppression circuit 71, so that a current flows from the battery 16 to the large capacity capacitor 52 through the current suppression circuit 71. On the other hand, when the inrush current prevention circuit 72 is ON, the inrush current prevention circuit 72 has a lower resistance than the current suppression circuit 71, so that the current flows from the battery 16 to the large capacity capacitor 52 through the inrush current prevention circuit 72.

The voltage monitor circuit 73 as an example of a monitor circuit surveils (monitors) one end side of the large capacity capacitor 52 and in a case where the voltage of the large capacity capacitor 52 reaches a predetermined constant voltage, the voltage monitor circuit 73 outputs a signal (on/off control signal) for turning on the inrush current prevention circuit 72 to the inrush current prevention circuit 72. On the other hand, in a case where the voltage of the large capacity capacitor 52 does not reach the predetermined constant voltage, the voltage monitor circuit 73 outputs a signal (on/off control signal) for turning off the inrush current prevention circuit 72 to the inrush current prevention circuit 72. Here, the on/off control signal is a signal for turning on or off the inrush current prevention circuit 72. The voltage monitor circuit 73 is configured using, for example, a reset IC. Until the charge of the constant voltage is stored in the large capacity capacitor 52, by turning off the inrush current prevention circuit 72, the voltage monitor circuit 73 prevents the inrush current at the time of activation, at which a constant current flows through the large capacity capacitor 52, from flowing through the DCDC up-converters 53 to 56 (see FIG. 6) in the latter stage. In addition, after the charge of the constant voltage is stored in the large capacity capacitor 52, by turning on the inrush current prevention circuit 72, the voltage monitor circuit 73 smooths a flow of the current after the time of the activation.

Figure 8:
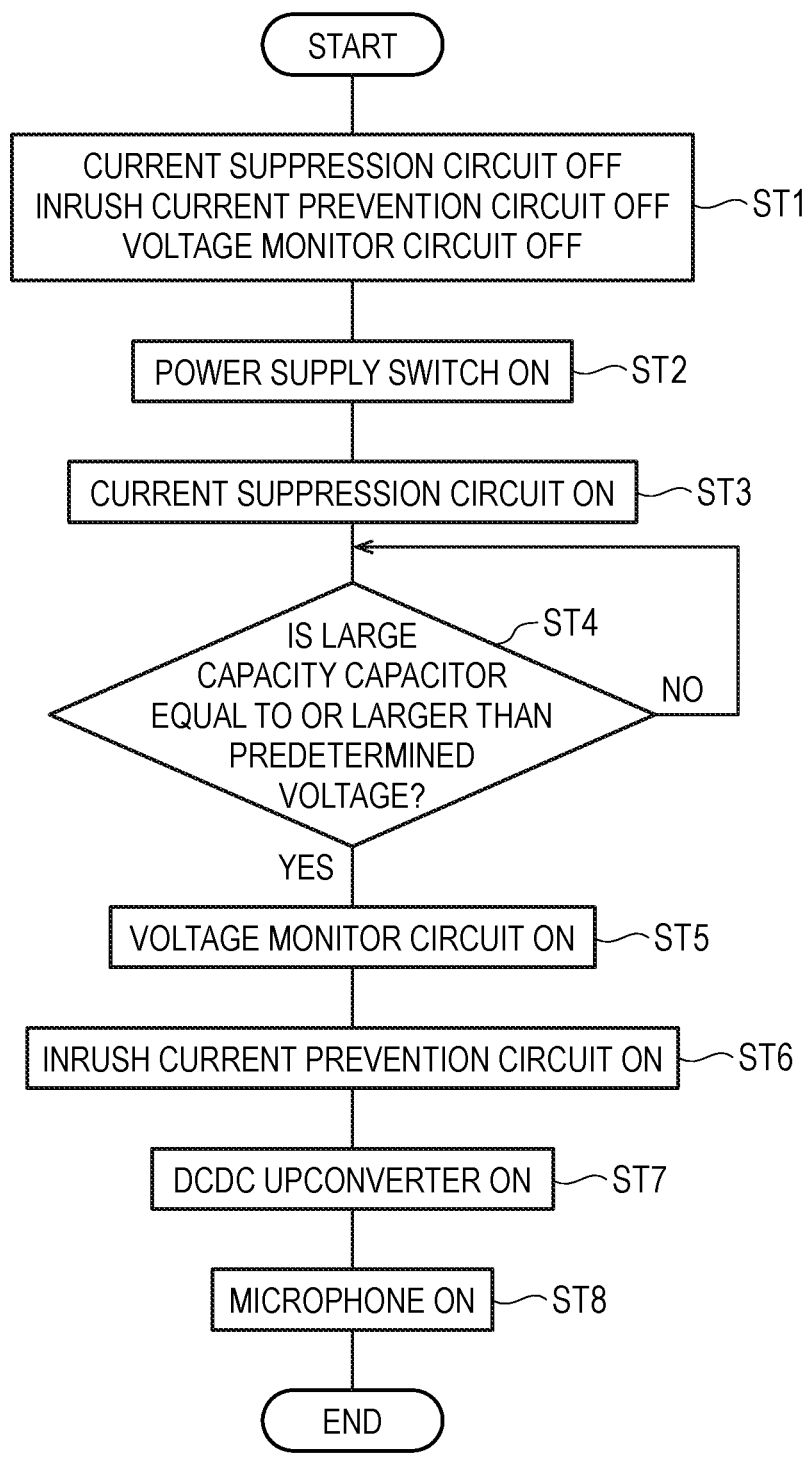
FIG. 8 is a flowchart for explaining in detail an example of a procedure for activating a microphone slave device according to Embodiment 2.

FIG. 8 is a flowchart for explaining in detail an example of a procedure for activating the microphone slave device 2 according to Embodiment 2.

In FIG. 8, in a case where the power supply switch 17 is turned off (that is, the battery 16 and the suppression circuit 60A are nonconductive), in the suppression circuit 60A of the power supply unit 50, all of the current suppression circuit 71, the inrush current prevention circuit 72, and the voltage monitor circuit 73 are in an off state (ST1).

The user operates the power supply switch 17 to be turned on (ST2). Generally, in a state in which the power supply switch 17 is turned off, it is assumed that the voltage of the large capacity capacitor 52 decreases. In this case, the voltage monitor circuit 73 outputs an off-signal (that is, on/off control signal for turning off the inrush current prevention circuit 72) to the inrush current prevention circuit 72. Since the inrush current prevention circuit 72 is a higher resistance in the OFF state, the inrush current from the battery 16 generated by the power supply switch 17 being turned on in the step ST2 flows to the large capacity capacitor 52 through the current suppression circuit 71 and is stored as a charge (ST3).

In a case where the microphone slave device 2 is used until immediately before, it is also assumed that the remaining charge is stored in the large capacity capacitor 52 and the voltage is maintained as the voltage close to the constant voltage. In this case, even if the power supply switch 17 is turned on, the current at the time of the inrush does not flow. The voltage monitor circuit 73 outputs an on-signal (that is, on/off control signal for turning on the inrush current prevention circuit 72) to the inrush current prevention circuit 72. The inrush current prevention circuit 72 is a low resistance when the inrush current prevention circuit 72 is turned ON and smooths the flow of the current from the battery 16 to the large capacity capacitor 52.

If the voltage of the large capacity capacitor 52 does not reach the constant voltage (NO in ST4), the voltage monitor circuit 73 waits until the voltage of the large capacity capacitor 52 reaches the predetermined constant voltage. If the voltage of the large capacity capacitor 52 is equal to or larger than the constant voltage (YES in ST4), the voltage monitor circuit 73 outputs the on-signal (that is, on/off control signal for turning on the inrush current prevention circuit 72) to the inrush current prevention circuit 72 (ST5). The inrush current prevention circuit 72 is a low resistance when the inrush current prevention circuit 72 is turned ON (ST6). The inrush current from the battery 16 is supplied to the large capacity capacitor 52 through the inrush current prevention circuit 72. When the battery voltage is applied to the DCDC up-converters 53, 54, 55, and 56 via the large capacity capacitor 52, the DCDC up-converters 53 to 56 are respectively activated (ST7). When the output voltages of the DCDC up-converters 53 to 56 are respectively applied to the constant voltage regulators 57, 58A, 58B, and 59, each of the units of the microphone slave device 2 operates (ST8). In addition, the output voltage of the DCDC up-converter 56 is directly applied to the display unit 14. As a result, the microphone slave device 2 can perform a sound collecting operation.

In steps ST6 and ST7, the DCDC up-converters 53, 54, 55, and 56 are turned on after the inrush current prevention circuit 72 is turned on, but the order may be reversed in some cases. For example, in a case where among the DCDC up-converters 53, 54, 55, and 56, the DCDC up-converter 53 has a low operation voltage as compared with the others, the voltage monitor circuit 73 maintains the off-signal (that is, on/off control signal for turning off the inrush current prevention circuit 72) but the DCDC up-converter 53 operates. Therefore, in step ST7, it is assumed that all of the DCDC up-converters 53, 54, 55, and 56 are turned on.

In this way, in the suppression circuit 60A, until the voltage of the large capacity capacitor 52 reaches a predetermined constant voltage, the inrush current from the battery 16 is charged in the large capacity capacitor 52 through the current suppression circuit 71. After then, when the voltage of the large capacity capacitor 52 reaches the constant voltage, the current from the battery 16 passes through the inrush current prevention circuit 72 and flows to a DCDC up-converter side via the large capacity capacitor 52. Therefore, the suppression circuit 60A can stably activate the microphone slave device 2. Since the microphone slave device operates with the stable current value, the battery can be used with, for example, one AA battery.

In the microphone slave device 2 according to Embodiment 2, the current suppression circuit 71 has a resistance value for reducing the inrush current and suppresses the inrush current from the battery 16. The inrush current prevention circuit 72 is switchable into a resistance value (impedance) higher or lower than the resistance value (an example of the first impedance) of the current suppression circuit 71, and suppresses the inrush current from the battery 16. The voltage monitor circuit 73 monitors the voltage by the charge stored in the large capacity capacitor 52 and changes a resistance value of the inrush current prevention circuit 72 according to the voltage. In a case where the voltage reaches the predetermined constant voltage (in other words, it is determined that the charge of the large capacity capacitor 52 exceeds a predetermined amount), the voltage monitor circuit 73 changes the resistance value of the inrush current prevention circuit 72 to be lower than the resistance value of the current suppression circuit 71. As a result, the peak current of the inrush current flowing through the large capacity capacitor 52 at the time of activating (charging) the battery 16 is suppressed. Therefore, deterioration of the large capacity capacitor 52 is suppressed and lives of parts are extended. Further, since the value of the current flowing through the microphone slave device 2 is controlled to be relatively equal to or less than a constant value, quick charging can be handled.

Embodiment 3

In Embodiment 1, the inrush current preventing circuit 51 suppresses the inrush current flowing through the large capacity capacitor 52. In Embodiment 2, the current flowing as the inrush current is suppressed to be a predetermined constant current and in a case where the DCDC up-converter 53 has a low operation voltage as compared with the others, the voltage monitor circuit 73 maintains the off-signal (as described above) but the DCDC up-converter 53 can operate. Therefore, there is a deviation at the timing when the DCDC up-converters 53, 54, 55, and 56 are activated.

In Embodiment 3, an example, in which the microphone slave device 2 is more stably activated by suppressing the amount of current of the inrush current at the time of providing the battery 16 in the same manner as Embodiment 2 and further selecting timings when various type of the DCDC up-converters 53, 54, 55, and 56 provided in the microphone slave device 2 are activated, will be described.

The power supply unit 50 of the microphone slave device 2 according to Embodiment 3 has the same configuration as the power supply unit 50 of the microphone slave device 2 according to Embodiment 1 and Embodiment 2 except for a suppression circuit 60B, so the same as in Embodiment 1 and Embodiment 2 is denoted by the same reference numeral, and description thereof will be simplified or omitted.

Figure 9:
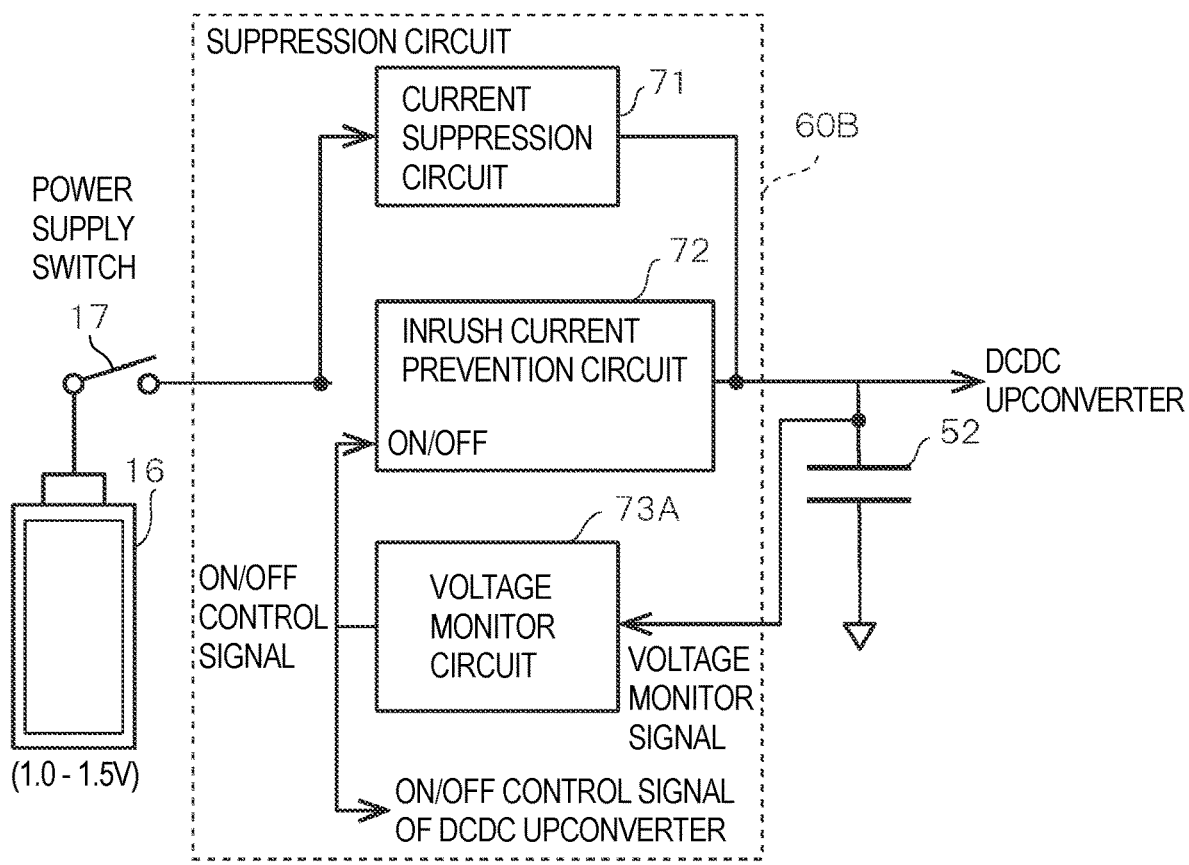
FIG. 9 is a diagram illustrating a configuration example of a suppression circuit according to Embodiment 3.

FIG. 9 is a diagram illustrating a configuration example of the suppression circuit 60B according to Embodiment 3. The suppression circuit 60B includes the current suppression circuit 71, the inrush current prevention circuit 72, and a voltage monitor circuit 73A in the same manner as the suppression circuit 60A according to Embodiment 2. The voltage monitor circuit 73A outputs the on/off control signal to the inrush current prevention circuit 72 and also outputs the on/off control signal to the DCDC up-converters 53 to 56 in the latter stage. Here, the on/off control signal output to the inrush current prevention circuit 72 is a signal for turning on or off the inrush current prevention circuit 72. In addition, the on/off control signal output to the DCDC up-converters 53, 54, 55, and 56 is a signal for turning on or off the DCDC up-converters 53, 54, 55, and 56.

Each of the DCDC up-converters 53, 54, 55, and 56 includes an on/off input terminal, and is activated and is in an operation state when the on-signal (that is, the on/off control signal for turning on the DCDC up-converter) is input. On the other hand, each of the DCDC up-converters 53, 54, 55, and 56 is in a non-operation state when the off-signal (that is, the on/off control signal for turning off the DCDC up-converter) is input.

Figure 10:
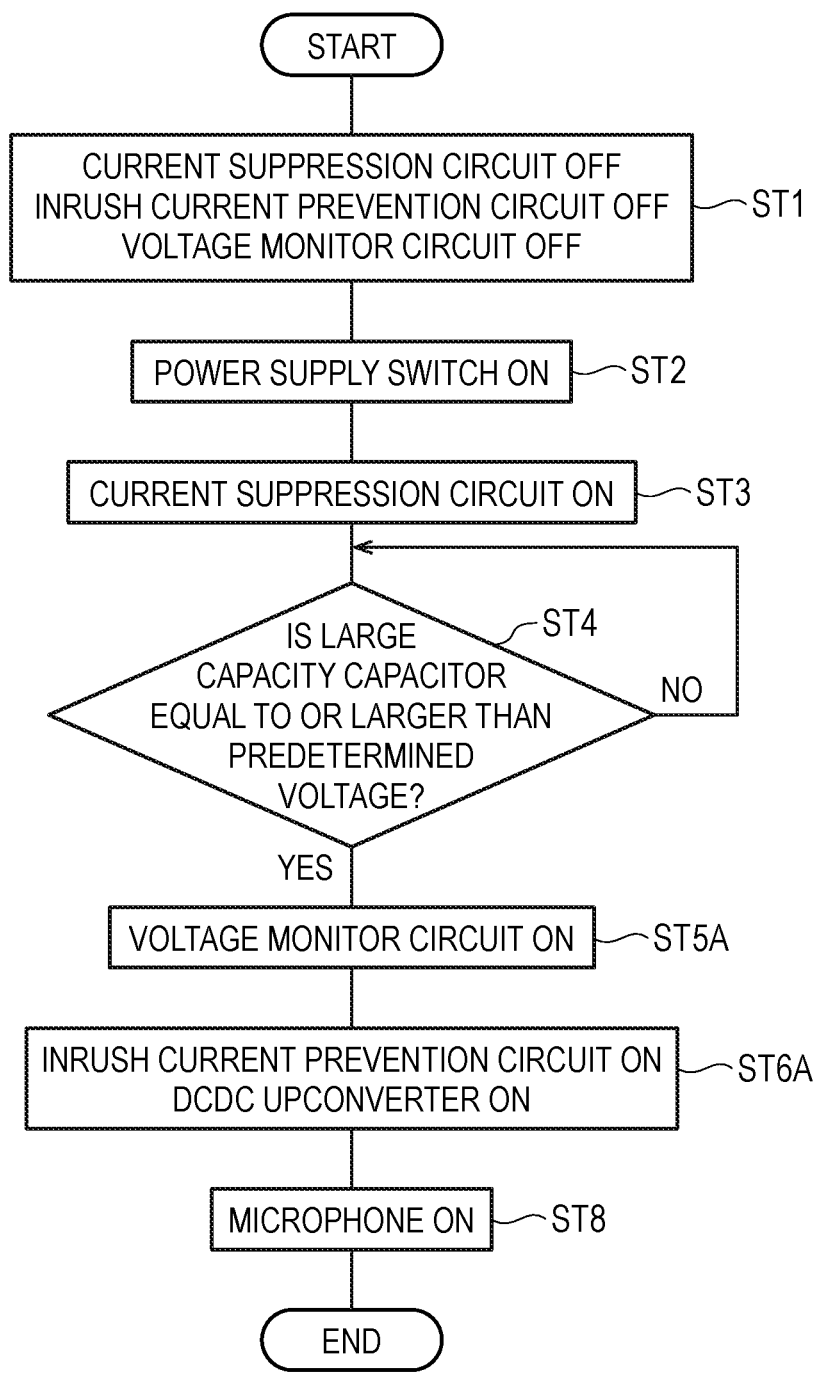
FIG. 10 is a flowchart for explaining in detail an example of a procedure for activating a microphone slave device according to Embodiment 3.

FIG. 10 is a flowchart for explaining in detail an example of a procedure for activating the microphone slave device 2 according to Embodiment 3. In description of FIG. 10, operations of steps ST1, ST2, ST3, ST4, and ST8 are similar to the activation procedure (see FIG. 8) according to Embodiment 2, so that the description will be simplified or omitted and different operations will be described.

In FIG. 10, if the voltage of the large capacity capacitor 52 reaches the predetermined constant voltage (YES in ST4), the voltage monitor circuit 73A outputs the on-signal (that is, on/off control signal for turning on each of the DCDC up-converters 53, 54, 55, and 56) to the inrush current prevention circuit 72 and each of the DCDC up-converters 53, 54, 55, and 56 (ST5A). In the same manner as Embodiment 1, the inrush current prevention circuit 72 is a low resistance when the inrush current prevention circuit 72 is turned ON. In addition, the DCDC up-converters 53, 54, 55, and 56 are activated at once by the on-signal (as described above) and applies the output voltage (constant voltage) suitable for the input voltage to each of the constant voltage regulators 57, 58A, 58B, and 59 (ST6A). When the output voltages of the DCDC up-converters 53, 54, 55, and 56 are respectively applied to the constant voltage regulators 57 to 59, each of the units of the microphone slave device 2 operates (ST8). In addition, the output voltage of the DCDC up-converter 56 is directly applied to the display unit 14. As a result, the microphone slave device 2 can perform a sound collecting operation.

In this way, in the suppression circuit 60B, before the DCDC up-converters 53, 54, 55, and 56 are turned on, the inrush current from the battery 16 is stored in the large capacity capacitor 52 as a charge. If the DCDC up-converters 53, 54, 55, and 56 are turned on at once by the on-signal from the voltage monitor circuit 73A, the inrush current from the battery 16 is supplied to the DCDC up-converters 53, 54, 55, and 56 at once. Therefore, the suppression circuit 60B can turn on the DCDC up-converters 53, 54, 55, and 56 at once. As compared with the case where the DCDC up-converters 53, 54, 55, and 56 are separately activated, by turning on the DCDC up-converters 53, 54, 55, and 56 at once, even though the microphone slave device 2 is not activated, it is possible to suppress wasteful power consumption. In addition, it is possible to suppress the operation of the microphone slave device 2 from becoming unstable as the microphone slave device 2 is activated in a state where the microphone slave device 2 is not sufficiently charged, and it is possible to stably activate the microphone slave device 2.

Further, by keeping the DCDC up-converters 53, 54, 55, and 56 in the off state before the charge reaching the constant voltage is stored in the large capacity capacitor 52, it is possible to suppress power consumption until then. In addition, since the wasteful power consumption is suppressed, a charging time of the large capacity capacitor 52 is shortened. The suppression circuit 60B of Embodiment 3 may be configured in combination with the microphone slave devices according to Embodiment 1 and Embodiment 2.

As described above, in the microphone slave device 2 according to Embodiment 3, in the case where the voltage of the large capacity capacitor 52 reaches the constant voltage (it is determined that the charge stored in the large capacity capacitor 52 exceeds a predetermined amount), the voltage monitor circuit 73A further outputs the on-signal (an example of an activating signal for activating each of a plurality of transformers) for turning on the DCDC up-converters 53, 54, 55, and 56 at once to each of the DCDC up-converters 53, 54, 55, and 56. As a result, it is possible to turn on the DCDC up-converters 53, 54, 55, and 56 at once, and In addition, to suppress the operation of the microphone slave device 2 from becoming unstable, and to stably activate the microphone slave device 2.

Embodiment 4

In Embodiment 1, the inrush current preventing circuit 51 suppresses the inrush current flowing through the large capacity capacitor 52. In Embodiment 2, the current as the inrush current is suppressed to be a constant current. In Embodiment 3, the loads embedded the microphone slave device 2 are activated at once. In Embodiment 4, an example in which the plurality of loads embedded in the microphone slave device 2 are activated in order of a priority will be described. The priority is determined such that, for example, the load (for example, the controller 10), which takes time to be activated and to become stable, is activated first, and the load (for example, the display unit 14), which is activated and stabilized immediately, is activated later.

Specifically, in Embodiment 4, the DCDC up-converter 53 which supplies the current to the controller 10 has the highest priority, the DCDC up-converters 54 and 55 which supply the current to the radio unit 11 (including the preamplifier 11z) and the power amplifier 11A have the next highest priority, and the DCDC up-converter 56 which supplies the current to the memory 15 and the display unit 14 has the lowest priority.

Figure 11:
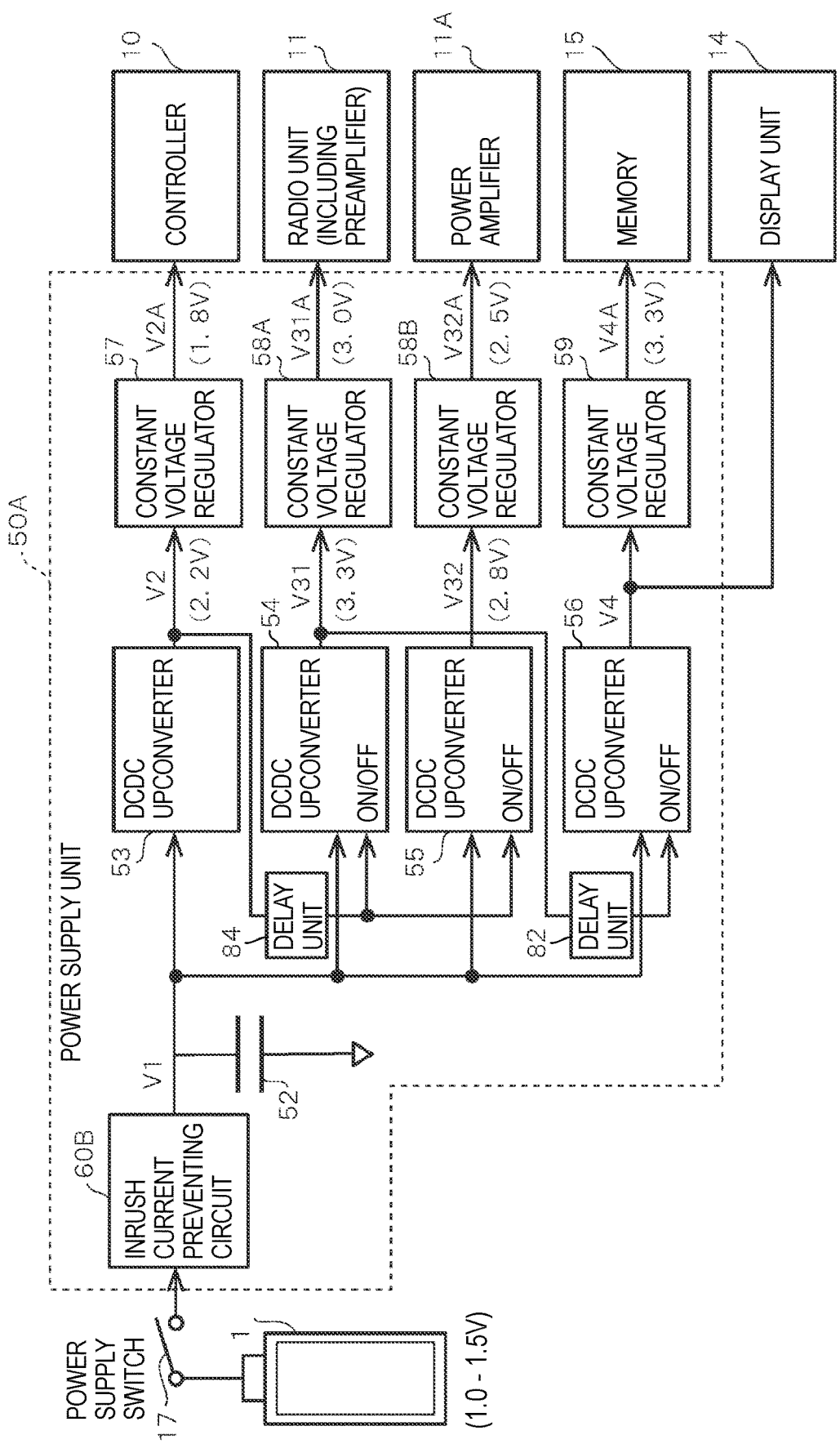
FIG. 11 is a diagram illustrating an overall configuration example of a power supply unit according to Embodiment 4.

FIG. 11 is a diagram illustrating an overall configuration example of a power supply unit 50A according to Embodiment 4. The power supply unit 50A has the same configuration as the power supply unit 50 according to Embodiment 1 and has the suppression circuit 60B according to Embodiment 3 instead of the inrush current preventing circuit 51 according to Embodiment 1, so the same is denoted by the same reference numeral, and description thereof will be simplified or omitted.

The power supply unit 50A includes delay units 84 and 82. The delay unit 84 is interposed in a signal line connecting the output of the DCDC up-converter 53 and the respective on/off terminals of the DCDC up-converters 54 and 55 and delays the on-signal or the off-signal of the DCDC up-converters 54 and 55 output from the DCDC up-converter 53. In addition, the delay unit 82 is interposed in a signal line connecting the output of the DCDC up-converter 54 and the on/off terminal of the DCDC up-converter 56 and delays the on-signal or the off-signal of the DCDC up-converter 56 output from the DCDC up-converter 54.

In the power supply unit 50A, the voltage monitor circuit 73A outputs the on/off signal to the inrush current prevention circuit 72 and outputs the on/off signal to only the DCDC up-converter 53 in the latter stage. The output voltage of the DCDC up-converter 53 is input to the on/off terminals of the DCDC up-converters 54 and 55 via the delay unit 84 as the on/off signal. In addition, the output voltage of the DCDC up-converter 54 is input to the on/off terminal of the DCDC up-converter 56 via the delay unit 82 as the on/off signal.

When the voltage of the large capacity capacitor 52 reaches the predetermined constant voltage, the DCDC up-converter 53 is firstly activated, then the DCDC up-converters 54 and 55 are activated, and finally, the DCDC up-converter 56 is activated. Since the DCDC up-converters 54 and 55 supply current to the radio unit 11 (including the preamplifier 11z) and the power amplifier 11A, by activating the DCDC up-converters 54 and 55 at the same time, the transmission operation in the wireless communication is stabilized.

Figure 12:
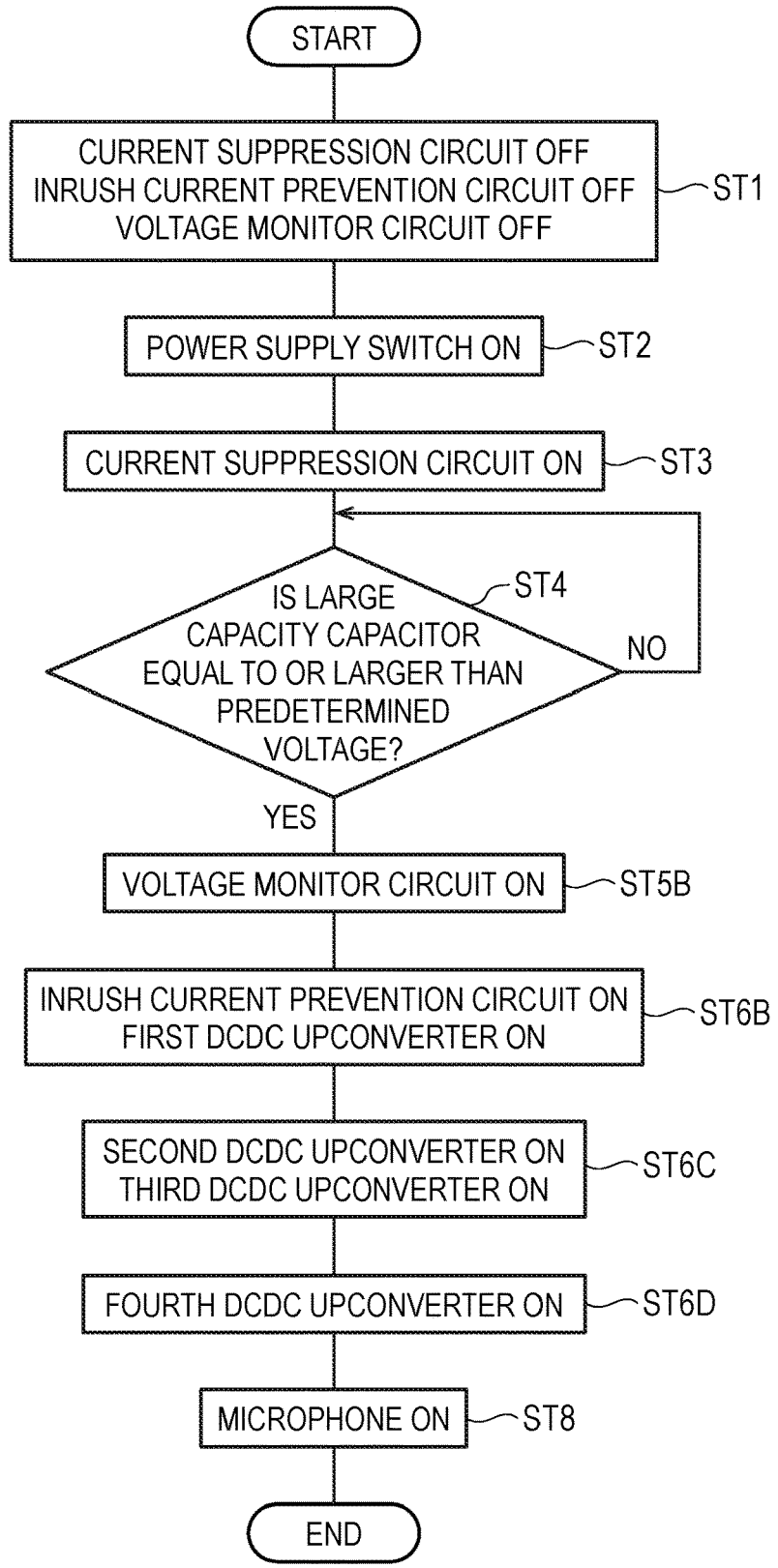
FIG. 12 is a flowchart for explaining in detail an example of a procedure for activating a microphone slave device according to Embodiment 4.

FIG. 12 is a flowchart for explaining in detail an example of a procedure for activating the microphone slave device 2 according to Embodiment 4. In description of FIG. 12, operations of steps ST1, ST2, ST3, ST4, and ST8 are similar to the activation procedure (see FIG. 10) according to Embodiment 3, so that the description will be simplified or omitted and different operations will be described.

In FIG. 12, if the voltage of the large capacity capacitor 52 reaches the predetermined constant voltage (YES in ST4), the voltage monitor circuit 73A outputs the on-signal (that is, on/off control signal for turning on the DCDC up-converter 53) to the inrush current prevention circuit 72 and the DCDC up-converter 53 (ST5B). In the same manner as Embodiment 1, the inrush current prevention circuit 72 is a low resistance when the inrush current prevention circuit 72 is turned ON. The DCDC up-converter 53 (an example of a first DCDC up-converter) is activated by the on-signal described above and applies the output voltage (constant voltage) suitable for the input voltage to the constant voltage regulator 57 (ST6B). In addition, the DCDC up-converter 53 outputs the on-signal (that is, the on/off control signal for turning on the DCDC up-converters 54 and 55) to the DCDC up-converters 54 and 55 via the delay unit 84 (ST6C). The DCDC up-converters 54 and 55 (examples of second and third DCDC up-converters) are activated by the on-signal described above and applies the output voltage (constant voltage) suitable for the input voltage to each of the constant voltage regulators 57 and 58. In addition, the DCDC up-converter 54 outputs the on-signal (that is, the on/off control signal for turning on the DCDC up-converter 56) to the DCDC up-converter 56 via the delay unit 82 (ST6D). Not the DCDC up-converter 54 but the DCDC up-converter 55 may output the on-signal to the DCDC up-converter 56 via the delay unit.

The DCDC up-converter 56 is activated by the on-signal described above and applies the output voltage (constant voltage) suitable for the input voltage to the constant voltage regulator 59. In addition, the DCDC up-converter 56 directly applies the output voltage to the display unit 14 which is a load without via the constant voltage regulator. When the output voltage of the DCDC up-converter 56 is applied to the constant voltage regulator 59, each of the units of the microphone slave device 2 operates (ST8). As a result, the microphone slave device 2 can perform a sound collecting operation.

In this way, in the power supply unit 50A, the delay units 84 and 82 are provided and by shifting the timings of activating the respective DCDC up-converters 53 to 56, it is possible to disperse the current flowing at the time of the inrush to the DCDC up-converters 53 to 56. Further, it is also possible to select activating of the controller 10, the radio unit 11, the power amplifier 11A, the memory 15, and the display unit 14 which are loads. Even though the operation is unstable or inoperative as the microphone slave device, by selecting to activate all of the loads, it is possible to suppress wasteful consumption of power to some of the loads.

After the voltage is applied to the DCDC up-converter 53 and the controller 10 which is a load is activated, the voltage may be applied so as to activate the remaining DCDC up-converters 54, 55, and 56 at once. In addition, in the power supply unit 50A, the delay units 84 and 82 are provided to delay the on-signal. However, in a case where it takes time to activate the DCDC up-converter, even if the plurality of DCDC up-converters are connected in series, a delay occurs. In this case, it is not necessary to provide the delay unit and the delay unit can be omitted. Therefore, the number of parts is reduced and a cost increase can be suppressed. In addition, the power supply unit 50A of Embodiment 4 may be configured in combination with the microphone slave devices 2 according to Embodiment 1 and Embodiment 2.

As described above, in the microphone slave device 2 in Embodiment 4, the k-th DCDC up-converter (k: 2 to n and n: a positive integer indicating the total number of DCDC up-converters) among the DCDC up-converters 53 to 56 is activated after the (k−1)-th DCDC up-converter is activated. As a result, the rush current to the DCDC up-converters 53 to 56 does not occur at once, and the current at the time of the inrush to the DCDC up-converters 53 to 56 can be dispersed. Therefore, a storage capacity of the battery can be reduced and the microphone slave device 2 can be used with a minimum number of batteries, for example, one battery.

Although the various embodiments are described with reference to the accompanying drawings, the present disclosure is not limited to such an example. Those skilled in the art can conceive various modification examples, change examples, substitution examples, addition examples, deletion examples, and equivalent examples within the scope described in the claims and these rightly belong to the technical scope of the present disclosure. Further, without departing from the gist of the invention, the respective components in the various embodiments described above may be arbitrarily combined.

The present disclosure is useful as a microphone device which supplies a voltage to various loads included in an embedded electric circuit even when using one battery, and improves handling at the time of use and improves convenience of the user.

The present application is based upon Japanese Patent Application (Patent Application No. 2018-010848) filed on Jan. 25, 2018, the contents of which are incorporated herein by reference.

What is claimed is:

1. A microphone device for transmitting a collected audio signal to a receiving device wirelessly, the microphone device comprising:
a battery having an output voltage of 1.0 V to 1.5 V;
a current suppresser that is connected in series with the battery and suppresses a current from the battery; and
a plurality of transformers each of which is connected in series between the current suppresser and each of a plurality of loads and outputs a voltage in response to a corresponding load of the plurality of loads connected thereto based on an output of the current suppresser,
wherein the current suppresser comprises:
a first suppression circuit that has a first impedance and suppresses the current from the battery;
a second suppression circuit that is changeable into an impedance higher or lower than the first impedance and suppresses the current from the battery;
a capacitor that has a predetermined capacity; and
a monitor circuit that monitors the charge stored in the capacitor and changes the impedance of the second suppression circuit in response to the charge; and
wherein in a case where it is determined that the charge exceeds a predetermined amount, the monitor circuit changes the impedance of the second suppression circuit to be lower than the first impedance.

2. The microphone device according to claim 1,
wherein in a case where it is determined that the charge exceeds the predetermined amount, the monitor circuit further outputs an activation signal for activating each of the plurality of transformers to each of the plurality of transformers.

* * * * *